Feb. 11, 1964 M. R. ROBINSON 3,120,949
TWO-DIRECTIONAL AGRICULTURAL HEATER
Filed Jan. 24, 1961 3 Sheets-Sheet 1

INVENTOR.
MAYES R. ROBINSON
BY Munn & Liddy
ATTORNEYS

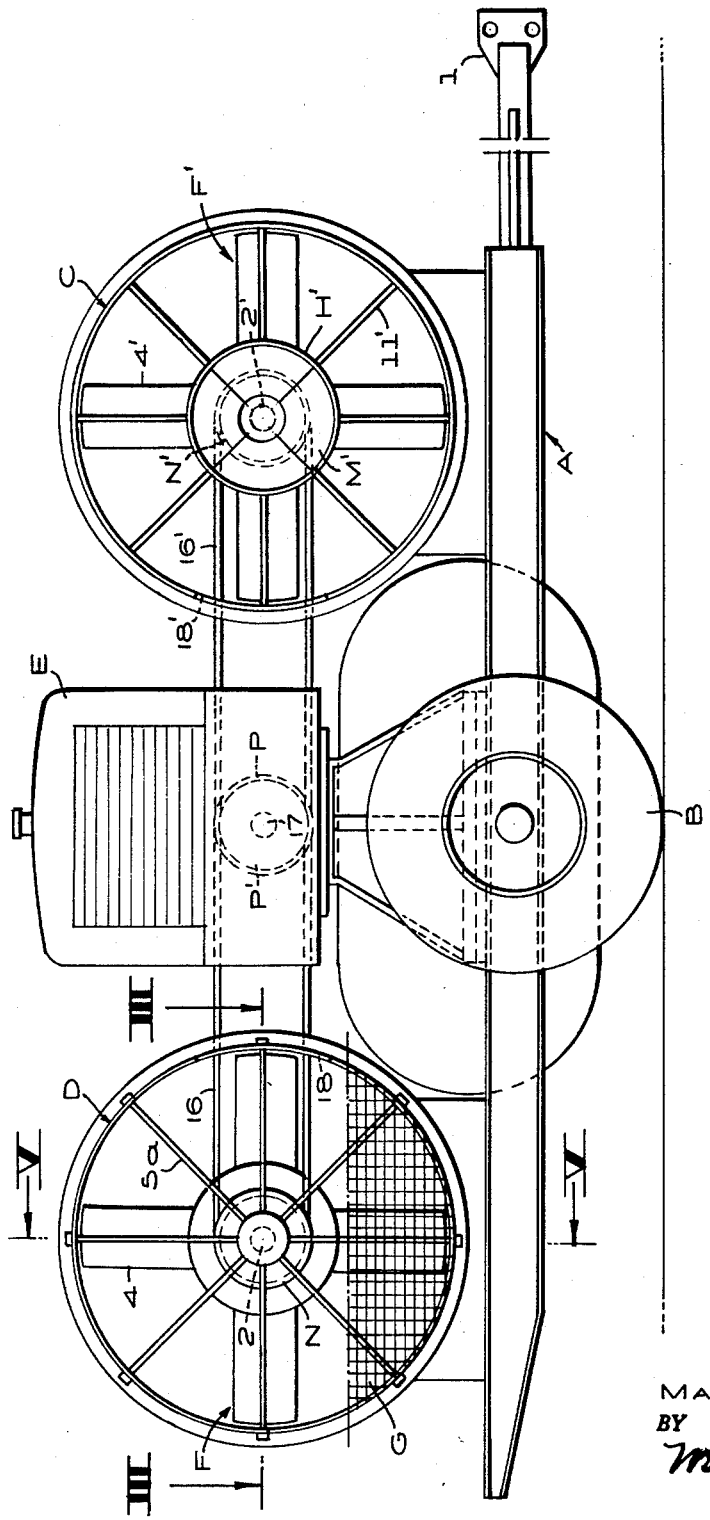

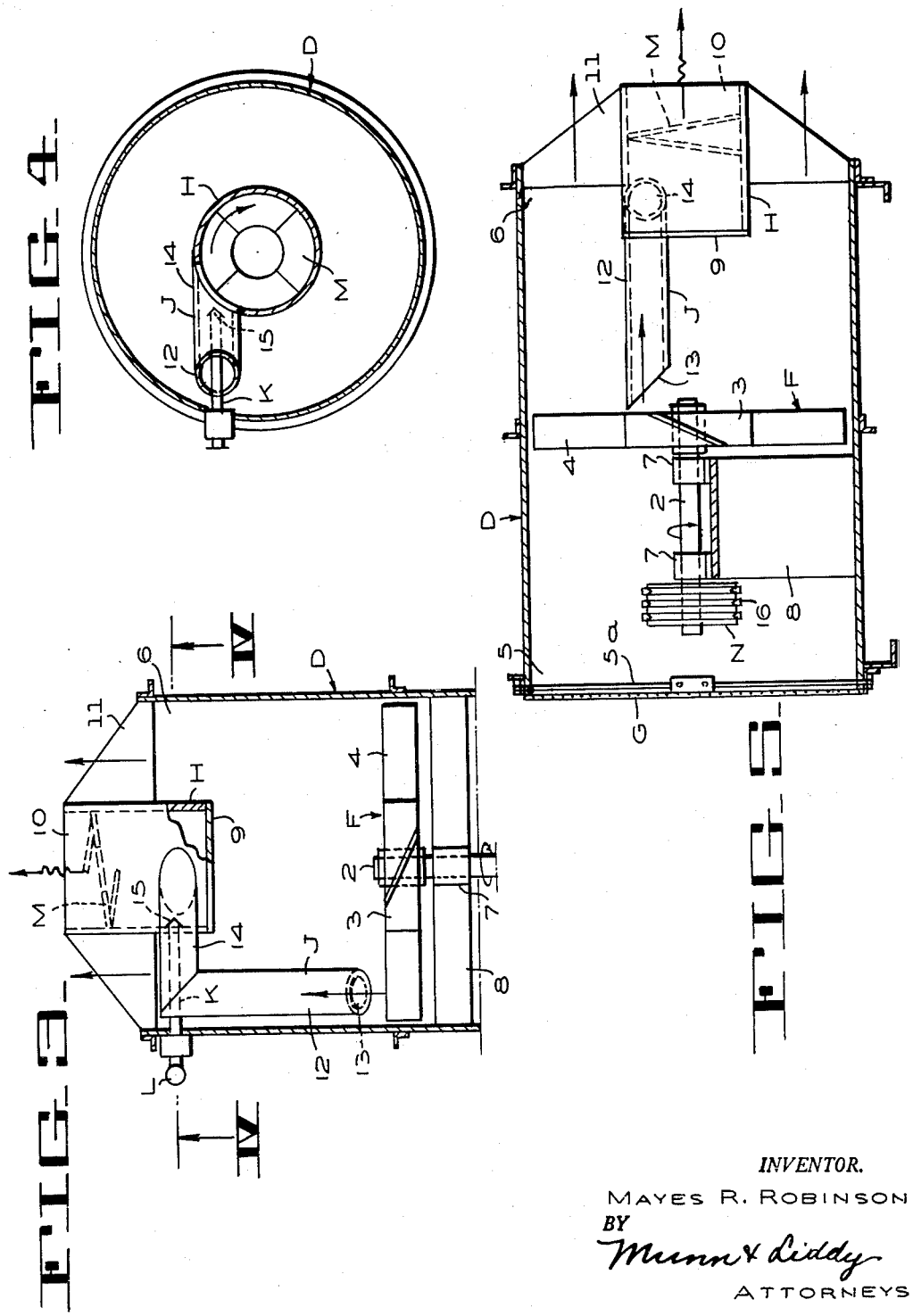

3,120,949
TWO-DIRECTIONAL AGRICULTURAL HEATER
Mayes Randolph Robinson, % Robinson Corp.,
Box 45, San Martin, Calif.
Filed Jan. 24, 1961, Ser. No. 84,718
11 Claims. (Cl. 263—19)

The present invention relates to improvements in a portable two-directional agricultural heater patented by George T. Neundorfer on July 8, 1952, Patent No. 2,602,-267. In that patent, it was mentioned where there is a below-freezing temperature of approximately 28° F., the produce being grown will not become frost bitten if the atmosphere surrounding the product is raised periodically in temperature about 4° F., every half hour. In the interim between heating, the prevailing temperature may be permitted to drop again towards 28° F., without damage to the product. The patent discloses a portable two-directional agricultural heater that may be moved into an area periodically, depending upon the temperature, condition of plant life, moisture content of the air, etc. The heated air delivered will travel about 600 feet from opposite sides of the device.

The operation of the device is far less expensive and much cleaner than providing smudge pots, or stack-type heaters, for heating orchards to prevent frost damage to any plant life ordinarily subject thereto. The fuel consumed by the two heaters is appreciably less than that required to maintain smudge pots, etc. When utilizing such pots, etc., the entire area to be protected must be maintained at an atmospheric temperature above freezing.

The present invention pertains to the placing of the burner body on the downstream side of the fan that is rotatably mounted in the tubular shield so that the heat from the burner will be delivered to the air stream moving through the shield after the air has passed the fan. The bearings for the fan shaft are disposed on the upstream side of the burner and so are the pulley and belts that rotate the shaft. In this way the fan acts on cool air rather than on heated air and a greater quantity of air will be moved through the shield. In addition the shaft bearings, pulleys and belts are subjected to cool air because the air is heated after it passes these parts. The parts will therefore operate more effiectiently.

The burner body is centrally disposed on the down stream side of the main stream of air from the fan and novel means are used for removing some of the air from the inner surface of the tubular shield and at a point where the air is traveling at its greatest speed, namely at a point adjacent to the circle described by the tips of the rotating fan blades. The quantity of air thus removed from the main air stream is called the burner supply air stream and it is conveyed to the burner body and enters the body in a direction substantially tangent to the body so that this air is whirled or rotated in the body. Burning atomised fuel is delivered to the burner supply air stream just at the time the air enters the burner body.

Novel means is provided in the burner body for retarding the flow of air and burning atomized fuel toward the outlet end of the body so that sufficient air will be fed to the fuel to assure complete combustion. A helix or series of baffle blades may constitute the novel retarding means. The heated air and burned products of combustion leave the outlet of the burner body at a high temperature and will mix with the air in the main stream that is being forced through the shield by the fan. Radially extending vanes are provided adjacent to the burner body for causing the air to flow in a straight line as it leaves the shield.

Other objects and advantages will appear as the specification continues and the novel features of the invention will be set forth in the appended claims.

*Drawings*

For a better understanding of the invention, reference should be had to the accompanying drawings forming a part of this application in which:

FIGURE 2 is a side elevation of the device shown in FIGURE 1;

FIGURE 3 is a horizontal section through one of the tubular shields and taken along the line III—III of FIGURE 2;

FIGURE 4 is a transverse section through the shield shown in FIGURE 3 and is taken along the line IV—IV of this figure; and FIGURE 5 is a transverse section through the shield shown in FIGURE 2 and is taken along the line V—V of this figure.

Figure 1:
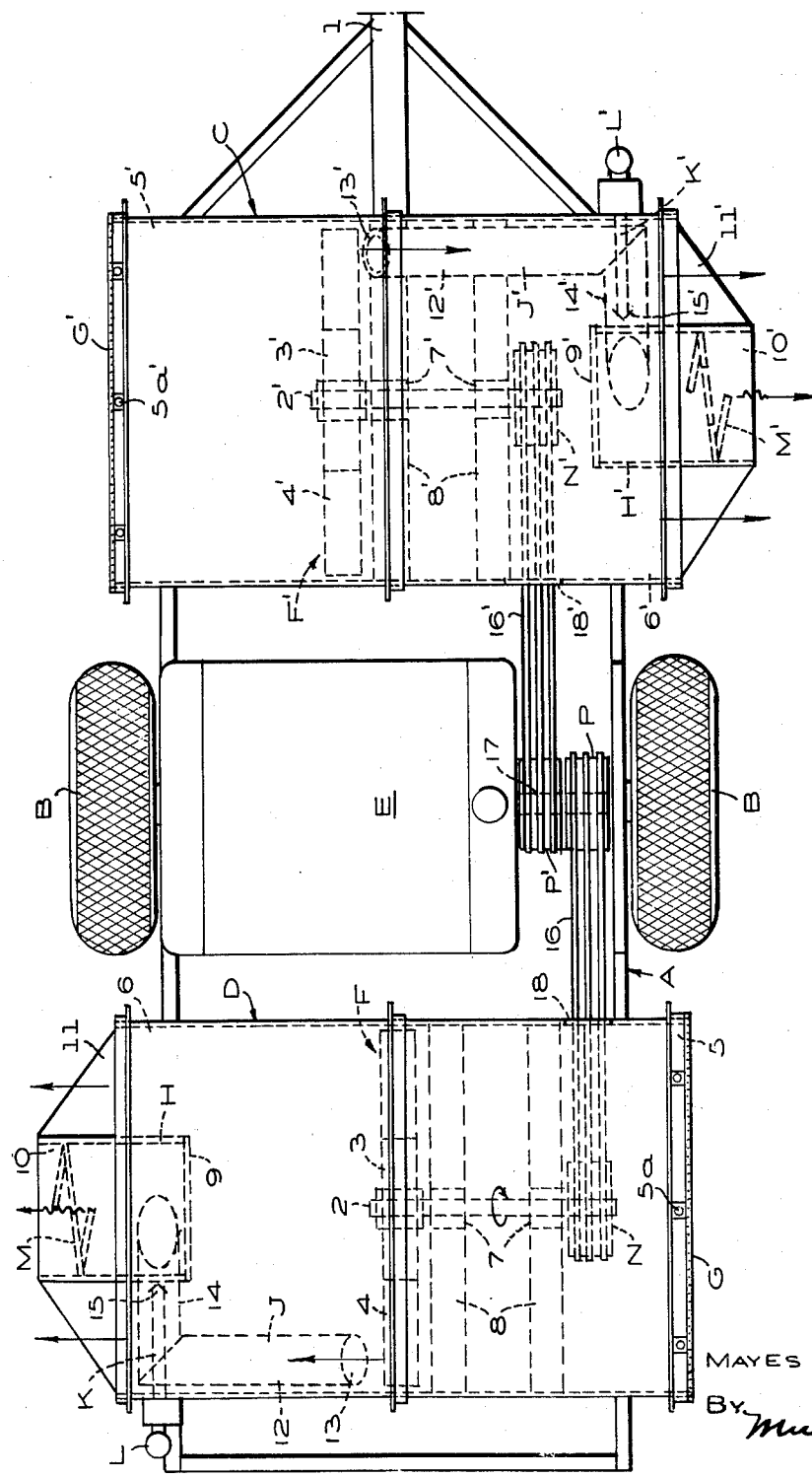
FIGURE 1 is a top plan view of the two-directional agricultural heater.

While I have shown only the preferred form of my invention, it should be understood that various changes or modifications may be made within the scope of the annexed claims without departing from the spirit thereof.

*Detailed Description*

In carrying out my invention, I provide a chassis indicated generally at A, in FIGURES 1 and 2, and centrally supported by a pair of wheels B. The forward end 1 of the chassis A may be coupled to a towing vehicle, not shown. The chassis may be drawn through orchards, fields and the like, where it is desired to raise the ambient air temperature above freezing in order to protect from frost damage.

Cylindrical shields C and D, or air stream guides, are mounted on the chassis A, and extend transversely thereacross from side to side. An engine E, or other suitable power source, is mounted on the chassis A, and between the shields C and D. When the chassis A is mounted on the wheels B, in order to be portable, the engine E will be positioned above the wheels, with the shields C and D disposed on opposite sides of the engine. This will provide a balanced unit.

The cylindrical shields C and D, or air stream guides, are of identical construction and therefore a detailed description of the shield D will suffice for both and corresponding parts will be given the same reference numerals and letters, but those in the shield C will be primed. It will be noted from FIGURE 1, that the main stream of heated air in the shield C will be forced to the right from the side of the chassis in a manner hereinafter described when one faces toward the front of the chassis. Also, and at the same time, the main stream of heated air in the shield D will be forced to the left from the opposite side of the chassis. The lengths of the two shields C and D are such that they will extend from side to side of the chassis A, and in fact project beyond both sides of the chassis for a slight distance.

The cylindrical shield D is shown in section in FIGURES 3, 4 and 5. A fan F is placed at the center of the shield D, see FIGURE 5, and is mounted on a shaft 2. The fan F has a hub 3, which is keyed or otherwise secured to the shaft 2. Fan blades 4 extend radially from the periphery of the hub 3, and are inclined so as to draw atmospheric air into the entrance end 5 of the shield D, and force it out through the exhaust or outlet end 6. The shield D, therefore, not only acts as a housing for the fan F, but it also constitutes a passageway for the main air stream that flows through the shield. The shaft 2 is rotatably mounted in bearings 7, which in turn are carried by a support 8 provided in the shield D. Any manner of supporting the bearings 7—7 may be resorted to. The support 8 will offer practically no resistance to the flow of the main stream of air through the shield.

A screen G covers the entrance 5 to the shield D, and prevents foreign matter from entering the interior of the shield. The screen overlies a spider grill 5a, see FIGURE 2, placed at the inlet 5. At the outlet end of the shield D, I place a burner body H, and this body is cylindrical and has a closed inner end 9 and an open exhaust end 10. The longitudinal axis of the burner body H coincides with the longitudinal axis of the shield D, and radially-extending vanes 11 support the burner body in this position. FIGURE 5 shows the vanes 11 projecting radially from the outer cylindrical surface of the burner body H, and the outer ends of these vanes are connected to the shield D adjacent to the outlet end of the shield. The vanes 11 serve the additional function of causing any rotating air in the passageway of the shield D to flow in a direction paralleling the axis of the shield and of the burner body H.

Novel means are used for removing a certain quantity of air from the main air stream in the shield D, and conveying this air into the burner body H, in a particular manner. This quantity of air is removed at a point near the inner surface of the tubular shield and is designated as the burner supply air stream. In FIGURE 3, I show an L-shaped air scoop and conduit J, that has one branch 12 paralleling and placed near the cylindrical wall of the shield D, see also FIGURE 4. The branch 12 has an air inlet opening 13 that is placed near the fan F and adjacent to the tips of the fan blades 4, where the air will be traveling the fastest. FIGURE 5 shows the air inlet 13 as extending at an angle so as to scoop in the air at a point near a circle followed by the moving outer tips of the fan blades. The arrow in the branch 12 indicates in FIGURES 3 and 5 the direction of the flow of air.

The air scoop J has its other branch 14 communicating with the burner body H. The arcuate arrow in FIGURE 4 illustrates how the air from the branch 14 will enter the burner body H, and be whirled clockwise when looking at this figure. I provide a fuel pipe K, that extends axially along the interior of the branch 14, and is provided with a fuel atomizer head 15 for spraying atomized fuel into the air flowing in the branch just at the time this air enters the burner body H. A valve L controls the amount of fuel fed to the pipe K under sufficient pressure to cause the fuel to atomize as it is sprayed from the head 15.

The burner body H has a helix-shaped swirl plate M secured to the inner surface of the cylindrical portion of the body. It is possible to have a plurality of swirl plates either connected together to form the helix or spaced apart. The purpose of the swirl plate M is to retard the flow of air and burning products of combustion so that complete combustion will take place. The combustion of the fuel takes place in a shorter length of burner body H than would otherwise be possible if the swirl plate M were not used.

The means for rotating the shafts 2 and 2' is clearly shown in FIGURES 1, 2 and 5. Pulleys N are keyed to the shaft 2, and V-belts 16 connect these pulleys to another group of drive pulleys P keyed to the shaft 17 of the engine E. In like manner the shaft 2', in the tubular shield C, has driven pulleys N' keyed thereto. V-belts 16' connect the driven pulleys N' to drive pulleys P' that are mounted on the engine shaft 17. Any other source of power for rotating the fans F and F' may be used. The V-belts 16 and 16' extend through openings 18 and 18' provided in the shields D and C, respectively, see FIGURE 1.

It should be noted that the pulleys N and N' and the belts 16 and 16' are not subjected to any heated air because the burner bodies H and H' are disposed on the down-stream sides of the fans F and F', whereas the pulleys and belts are disposed on the up-stream sides of the fans. The bearings 7—7 and 7'—7' are also disposed on the upstream sides of the fans F and F', respectively, and are therefore not subjected to heated air.

I do not wish to be confined to any particular dimensions for the various parts of the device. By way of example, if the fans F and F' are about four feet in diameter, I have found that if they are rotated at a speed to move air at the blade tips at about 15,000 feet per minute, the air scoops with six inch diameter passageways will deliver a sufficient quantity of air to the burner bodies to provide complete combustion for the atomized fuel. The air scoops J and J' supply all of the air that is necessary for burning the fuel. The fine spray of fuel caused by the fuel atomizer heads 15 and 15' makes for complete burning.

The fan blades 4 are true foil sections. It requires a large volume of air to burn the fuel so that complete burning takes place and there will be no smoke. Normally an external blower is used to provide sufficient air to the burner. My air scoops J and J' remove sufficient air from the main air stream and no auxiliary blower is necessary. The air to the burner not only assures complete combustion of the fuel, but this air is heated to a high degree and then mixes with the main stream of air to heat the latter to the desired extent. The heated air does not pass over the fan blades 4 and 4' because the burner bodies H and H' are located on the discharge sides of the fans F and F'.

The air pressure varies with the density of the air. Also the pressure varies inversely with the absolute temperature of the air. Air at 30° F. is heavier than air at 150° to 200° F. The fans F and F' move the colder air before it is raised to the higher temperatures. A greater volume of air will therefore be moved by the rotating fans. Cold air flows past the bearings 7 and 7' and past the V-belts. The belts will not stretch due to heat because they are not in the hot air stream.

It is important that the heated air forced from the cylindrical shields C and D be not flowing at too great a speed. Sufficient time must be given for the hot air to move out from the outlet 6 and 6' of the tubular shields D and C, respectively, to penetrate the atmospheric air to a depth of about 600 feet. If the hot air flow is too rapid, it will be prevented from moving in a substantially straight line from the shield outlets. The heated air and products of combustion which have been completely burned leave the exhaust openings 10 and 10' in the burner bodies H and H', and enter the centers of the main streams of air that is moved by the fans F and F'. The placing of the heated air in the centers of the main streams of air will cause uniform heating of all of the air in the two main air streams. The vanes 11 and 11' stop the air from rotating and this aids the heated air in mixing uniformly with the air in the main air streams and also directs the air streams in straight lines that will cause penetration of the atmospheric air up to 600 feet.

I claim:

1. In a heater: a tubular shield having a passageway therethrough with an inlet at one end and an outlet at its opposite end; a fan rotatably mounted for forcing a main air stream from the atmosphere and through the passageway for discharge in a cylindrical form through the outlet; a burner body positioned and centrally located on the down stream side of the fan and spaced therefrom; means for conveying some of the moving air from the passageway at a point near the fan periphery and for delivering it to the burner body; and means for delivering combustible fuel to the burner body for burning; the burner body having an outlet positioned for directing the heated air into the center of the cylindrical form of the main air stream flowing through the passageway.

2. The combination as set forth in claim 1: and in which the means for conveying air from the passageway removes air flowing adjacent to the inner periphery of the tubular shield at a place near the fan where the air movement is at its greatest speed.

3. The combination as set forth in claim 1: and in which the means for conveying and delivering air to the burner body conveys it so that the air will rotate in the burner body, thereby more thoroughly mixing with the combustible fuel and aiding in the complete combustion of the fuel.

4. The combination as set forth in claim 1: and in which the means for delivering the combustible fuel to the burner body for burning, sprays the fuel into the air just as this air in the air conveying means is entering the burner body; whereby a complete mixing of atomized fuel with air and a complete burning of the fuel results.

5. The combination as set forth in claim 1: and in which the burner body has a helix mounted therein for retarding the flow of heated air toward the outlet for aiding in a more complete combustion of the fuel; and in which radially extending vanes connect the burner body to the cylindrical shield; these vanes extending in the direction of the length of the shield and causing the air from the outlet end of the shield to flow parallel to the shield axis.

6. The combination as set forth in claim 1: and in which the burner body has its outlet centrally disposed with respect to the main air stream so that heated air and burning atomized fuel will be delivered to the center of the main air stream on the down stream side of the fan.

7. In a heater: a tubular shield having a passageway therethrough with an inlet at one end and an outlet at its opposite end; a fan mounted on a shaft that is axially aligned with the axis of the tubular shield; a bearing for supporting the shaft; means for rotating the shaft for forcing a main air stream from the atmosphere and through the passageway for discharge in the cylindrical form through the outlet; a burner body positioned and centrally located on the down stream side of the fan and spaced therefrom and from the bearing; a portion of the burner body being disposed within the tubular shield; means for conveying some of the moving air from the passageway at a point near to the fan periphery and for delivering it to the burner body; and means for delivering combustible fuel to the burner body for burning; the burner body having an outlet positioned for directing the heated air into the center of the cylindrical form of the main air stream flowing through the passageway.

8. The combination as set forth in claim 7: and in which the means for rotating the shaft comprises at least one driven pulley mounted on the shaft and a belt connecting the driven pulley to a drive pulley; the driven pulley and the belt being positioned on the up stream side of the burner so as not to be affected by the heated air delivered from the outlet of the burner body.

9. In a hot air blower: a tubular shield having a passageway therethrough with an inlet at one end and an outlet at the other end; a fan rotatably mounted for drawing in air at the inlet and for forcing a main air stream from the outlet; a cylindrical burner body positioned on the down stream side of the fan and centrally disposed with respect to the tubular shield and having an outlet; means for receiving some of the rapidly moving air at a point near the fan and for conveying this air to the burner body and delivering it as auxiliary air into said body in a tangent direction to the inner cylindrical surface of the body for causing the auxiliary air to whirl within the body; and means for delivering a combustible fuel into the auxiliary air stream as it enters the body for feeding a flame that will heat the whirling air in the body; the main air stream from the fan flowing in the tubular shield and past the central cylindrical burner for forming a hollow cylindrical high velocity main air stream that leaves the outlet of the tubular shield and is projected a considerable distance from the hot air blower, the heated air and gases of combustion issuing from the burner outlet being surrounded by the cylindrical main air stream; whereby they will be confined by the main air stream and will have to give up all of their heat in heating the air in the cylindrical column of the main air stream.

10. The combination as set forth in claim 9: and in which the cylindrical burner body has air retarding means therein for retarding the flow of heated air and gases of combustion through the burner body and for aiding in mixing the gases of combustion with the auxiliary air being received in the burner body, whereby a more uniform mixing of the heated gases of combustion with the auxiliary air will take place within the burner body and a more uniformly heated air will flow from the said body.

11. The combination as set forth in claim 9: and in which the means for receiving air from a point near the fan and for conveying it to the burner body comprises an air conduit having its inlet placed near the periphery of the fan for receiving air therefrom and having its outlet entering the cylindrical burner body at a tangent to the cylindrical surface of said body, whereby the air from the conduit will be given a whirling motion in the burner body; and the means for delivering a combustible fuel into the auxiliary air stream consists of a fuel pipe entering the air conduit and having a fuel atomizer for spraying the fuel into the auxiliary air stream as it enters the burner body, whereby a lighting of the sprayed fuel will form a flame issuing from the atomizer, this flame heating the auxiliary air.

References Cited in the file of this patent

UNITED STATES PATENTS

| | | |
|---|---|---|
| 2,150,345 | Schramm | Mar. 14, 1939 |
| 2,658,308 | Fowler | Nov. 10, 1953 |
| 2,787,318 | Wolfensperger | Apr. 2, 1957 |
| 2,858,646 | Higgins | Nov. 4, 1958 |
| 2,889,142 | Ammann | June 2, 1959 |
| 2,972,208 | Martin | Feb. 21, 1961 |